(12) United States Patent
Garelli et al.

(10) Patent No.: US 9,910,460 B2
(45) Date of Patent: Mar. 6, 2018

(54) MICRO-PERFORATION OVERMOLDING GATE

(71) Applicant: Apple Inc., Cupertino, CA (US)

(72) Inventors: Adam T. Garelli, Santa Clara, CA (US); Simon Regis Louis Lancaster-Larocque, Gloucester (CA); Dinesh C. Mathew, Fremont, CA (US); Bruce E. Berg, Encinitas, CA (US); Sarah J. Montplaisir, Santa Cruz, CA (US); Nicholas A. Rundle, San Jose, CA (US)

(73) Assignee: APPLE INC., Cupertino, CA (US)

( * ) Notice: Subject to any disclaimer, the term of this patent is extended or adjusted under 35 U.S.C. 154(b) by 220 days.

(21) Appl. No.: 14/815,376

(22) Filed: Jul. 31, 2015

(65) Prior Publication Data

US 2016/0143168 A1    May 19, 2016

Related U.S. Application Data

(60) Provisional application No. 62/078,893, filed on Nov. 12, 2014.

(51) Int. Cl.
| | |
|---|---|
| *H05K 5/02* | (2006.01) |
| *F21V 33/00* | (2006.01) |
| *G06F 1/16* | (2006.01) |
| *B29C 45/14* | (2006.01) |
| *B29C 45/34* | (2006.01) |
| *B29K 19/00* | (2006.01) |

(Continued)

(52) U.S. Cl.
CPC ...... *G06F 1/1656* (2013.01); *B29C 45/14344* (2013.01); *B29C 45/34* (2013.01); *B29C 2045/14352* (2013.01); *B29C 2045/14368* (2013.01); *B29K 2019/00* (2013.01); *B29K 2033/08* (2013.01); *B29L 2031/34* (2013.01)

(58) Field of Classification Search
CPC ............................. H05K 5/0234; B29C 45/34
See application file for complete search history.

(56) References Cited

U.S. PATENT DOCUMENTS

| | | | |
|---|---|---|---|
| 5,248,467 A * | 9/1993 | Cushman | .......... B29C 45/14786 264/102 |
| 2006/0043645 A1* | 3/2006 | Goettsch | ................. B29C 45/34 264/400 |

(Continued)

*Primary Examiner* — Elmito Breval
(74) *Attorney, Agent, or Firm* — Brownstein Hyatt Farber Schreck, LLP

(57) ABSTRACT

An electronic device having protruding features and a method for molding the protruding features to the electronic device are described. The protruding features may be formed by a molding tool that releases a material that flows through several apertures of a substrate. Also, the molding tool is positioned with respect to the substrate such that the material from the molding tool flows from an interior region of the substrate to an exterior region of the substrate via the several apertures. Accordingly, each aperture extends from an opening of the interior region and to an opening of the exterior region of the substrate. In some cases, the apertures may include a conical shape. For example, the opening in the interior region may include a diameter greater than a diameter of the opening in the exterior region. In this manner, the material, when cured, is mechanically secured to the substrate.

20 Claims, 13 Drawing Sheets

(51) Int. Cl.
 *B29K 33/00* (2006.01)
 *B29L 31/34* (2006.01)

(56) References Cited

U.S. PATENT DOCUMENTS

| | | |
|---|---|---|
| 2006/0087067 A1 | 4/2006 | Shamoon |
| 2006/0188595 A1* | 8/2006 | Furukawa ......... B29C 45/14262 |
| | | 425/129.1 |
| 2008/0029930 A1* | 2/2008 | Ito ....................... B29C 45/0025 |
| | | 264/272.17 |
| 2008/0206930 A1* | 8/2008 | Farnworth .............. H01L 21/56 |
| | | 438/127 |
| 2008/0229625 A1* | 9/2008 | Frasson .................. A43B 13/24 |
| | | 36/59 C |
| 2008/0251663 A1 | 10/2008 | Tracy |
| 2011/0256255 A1* | 10/2011 | Guo ........................ B29C 45/34 |
| | | 425/420 |
| 2013/0093115 A1 | 4/2013 | Masanek, Jr. |
| 2015/0255913 A1* | 9/2015 | Jelak ....................... B29C 45/03 |
| | | 439/587 |

\* cited by examiner

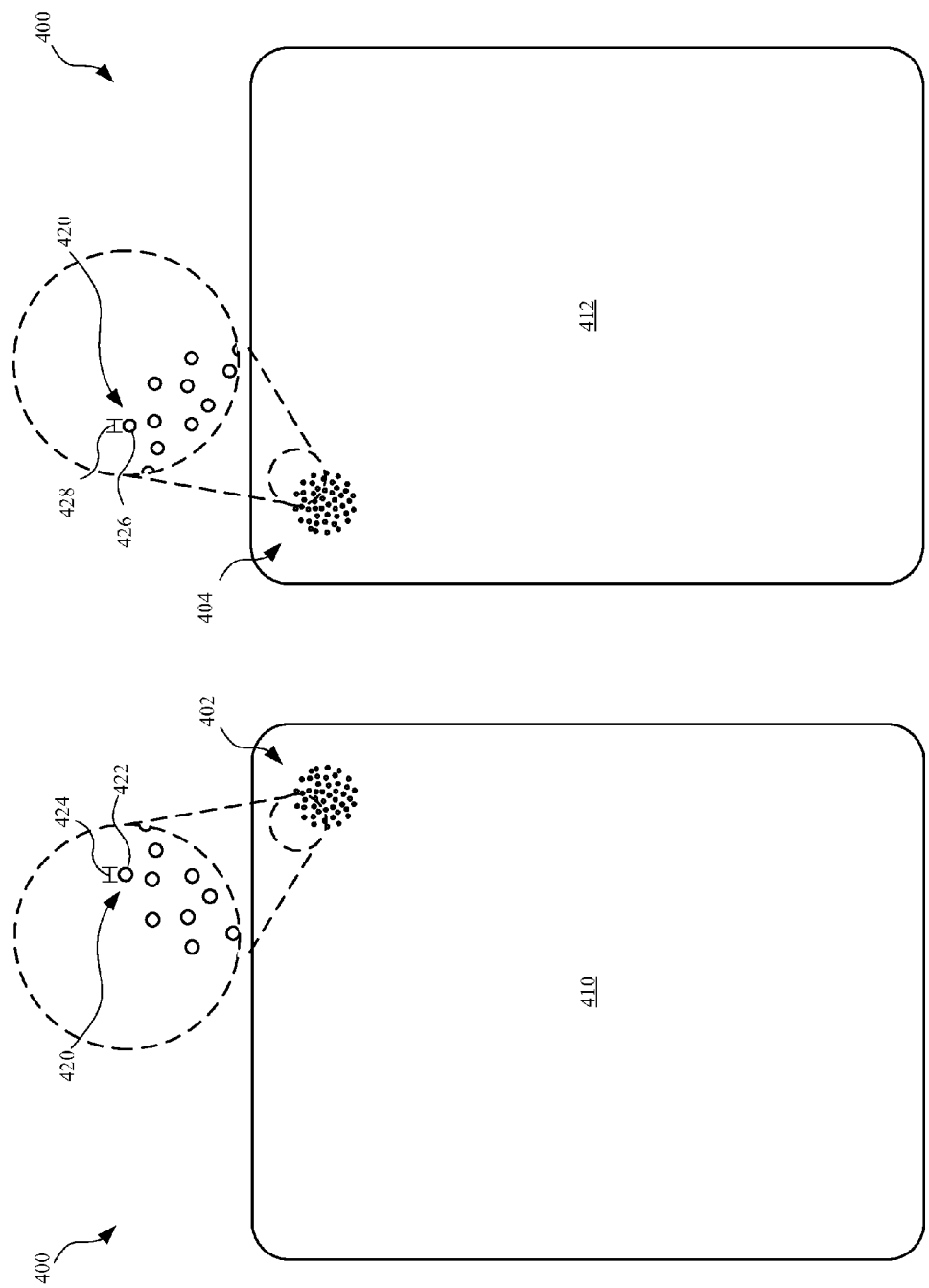

MICRO-PERFORATION OVERMOLDING GATE

CROSS-REFERENCE TO RELATED APPLICATIONS

The present application claims the benefit of priority under 35 U.S.C. §119(e) to U.S. Provisional Application No. 62/078,893, entitled "MICRO-PERF OVERMOLDING GATE" filed Nov. 12, 2014, the content of which is incorporated herein by reference in its entirety for all purposes.

FIELD

The described embodiments relate generally to features of an electronic device. In particular, the present embodiments relate to protruding features formed from a liquid polymer and secured with a portable electronic device.

BACKGROUND

Portable electronic devices known in the art may include one or more protruding features, or "feet," which extend from a base portion an electronic device. These feet can be secured to the base portion such that the feet engage a surface (for example, a desk or table) on which the electronic device lies. Multiple techniques are known for securing the protruding features to the electronic device. For instance, each protruding feature may be adhesively secured to the electronic device. Alternatively, each foot may be molded onto the bottom portion by simply curing a fluid onto an exterior surface of the base portion.

However, these techniques have drawbacks. One or more protruding feature(s) may become delaminated in either the adhesive technique or the molding technique previously described, and detach from the based portion. Further, when the protruding features are adhesively secured and become delaminated, the feet may tend to secure to other objects nearby which is undesired. In either case, the protruding features are prone to falling off of the electronic device.

SUMMARY

In one aspect, a method for forming a polymer feature to a substrate having an interior region and an exterior region opposite the interior region is described. The method may include sending a material in a fluid form through a first micro-aperture using a molding tool. The first micro-aperture may be formed in the substrate and include a first opening having a first cross sectional area at the interior region. Also, a channel may be formed through the substrate that connects the first opening with a second opening having a second cross sectional area at the exterior region. The method may further include receiving the material from the channel at the exterior region via the second opening. In some embodiments, some of the material remains within the channel. Also, the method may further include allowing gas from within the material to escape at a second micro-aperture.

In another aspect, a molding tool configured to mold a feature to a substrate having an interior region and an exterior region opposite the interior region is described. The molding tool may include a first chamber configured to align with and fill first micro-apertures formed through the substrate with a moldable material used to form the feature. The molding tool may further include a second chamber configured to align with second micro-apertures formed through the substrate. The molding tool may further include a mold cavity that communicates with the first chamber and the second chamber via the first micro-apertures and the second micro-apertures, respectively. The mold cavity may include an internal cavity having a shape of the feature. In some embodiments, the feature is formed to the substrate by moving the moldable material from the first chamber through at least one of the first micro-apertures to the internal cavity of the mold cavity. The feature is further formed by removing gas from the mold cavity through at least one of the second micro-apertures. The feature is further formed by continuing the moving of the moldable material and removing the gas mold cavity until the internal cavity is substantially filled or until the shape of the feature is completed.

In another aspect, an electronic device is described. The electronic device may include a substrate that includes an interior region and an exterior region. The exterior region may define a visible region of the substrate when the electronic device is assembled. The electronic device may further include several micro-apertures. The several micro-apertures may include a first micro-aperture extending from a first opening in the interior region to a second opening in the exterior region. The first opening may include a first diameter, and the second opening may include a second diameter. The several micro-apertures may further include a second micro-aperture extending from a third opening in the interior region to a fourth opening in the exterior region. The third opening may include a third diameter. The electronic device may further include a polymer feature extending from the exterior region to the interior region. In some embodiment, a portion of the polymer feature is positioned within the first micro-aperture and the second micro-aperture.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 6 illustrates a plan view of an interior region of a substrate that includes multiple regions of apertures extending through the substrate, in accordance with the described embodiments;

FIG. 7 illustrates a plan view of the substrate shown in FIG. 6, oriented to show an exterior region of the substrate;

Figure 1:
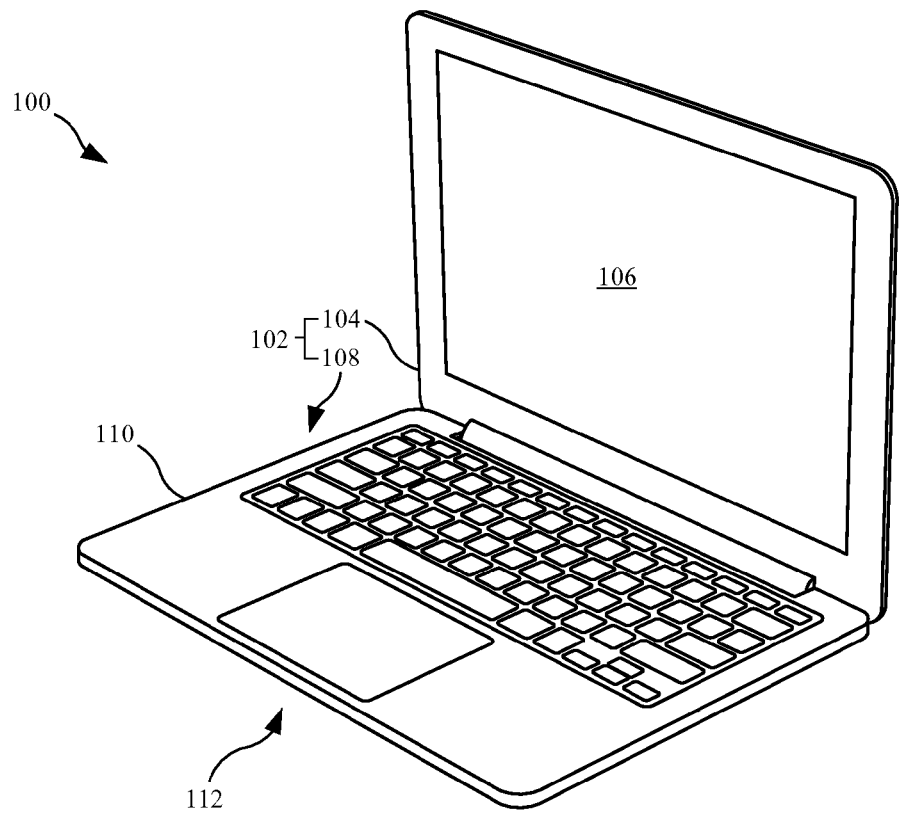
FIG. 1 illustrates an isometric view of an embodiment of an electronic device.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an enclosure of an electronic device. In particular, the disclosure relates to protruding features, sometimes referred to as "feet," located on a substrate that is part the enclosure. The protruding features may be designed to engage a surface (e.g., table, desk) on which the electronic device lies. Accordingly, the substrate may be associated with a bottom, or lower, region of the enclosure. Further, the substrate may be formed from metal (e.g., aluminum) that receives one or more protruding features. The substrate includes an interior region associated within an internal surface that is generally not visible when the electronic device is fully assembled. The substrate may further include an exterior region associated with an exterior surface that is generally visible when the electronic device is fully assembled. The protruding features generally extend from the exterior region of the substrate.

In order to improve integration of the protruding features to the substrate, the substrate may include certain features. For example, the substrate may include several micro-perforations that extend through the bottom region. In other words, the micro-perforations may be referred to relatively small apertures, or micro-apertures, with each aperture including an opening in the interior region of the substrate and an opening in the exterior region of the substrate. The micro-perforations are generally formed in locations of the substrate to which the protruding features are assembled. Also, each of the micro-perforations may include an opening having a diameter on the order of several microns. For instance, the diameter may be approximately in the range of 15-50 microns. In order to form the micro-perforations, a laser ablation tool may be used. The laser ablation tool is positioned relative to the substrate such that the substrate initially receives a laser beam (from the laser ablation tool) on the interior region. In this manner, any residual effects (e.g., burning, charring) are visible only on the interior region that is not visible when the electronic device is assembled, and the (visible) exterior region remains free of the residual effects. Also, once the laser ablation tool forms the aperture or cavity and extends through to the exterior region to form an opening in the exterior region, the resultant openings in the exterior region combine to define a roughness that is approximately similar to that of the remaining exterior region not associated with the openings. This includes instances of altered roughness of the exterior region due processes such as anodization, which in some cases, incorporates placing the substrate in an acidic bath. Further, in some cases, each micro-perforation may include a conical shape. In other words, the opening in the interior region may be larger (e.g., larger diameter) than the opening in the exterior region. As a result, the openings in the exterior regions may be small enough so as to be minimally visible, or even not visible, by the human eye.

A molding tool having a molding cavity may be used to form the protruding features. The molding tool is designed to emit a liquid that, when cured, is hardened and defines the shape of the protruding feature. The liquid is capable of passing through the micro-perforations and into the mold cavity. Also, the molding tool is positioned, relative to the substrate, to emit the liquid initially to the interior region of the substrate, thereby allowing the liquid to extend through the micro-perforations and exit through the exterior region. In this manner, protruding features form several mechanical interlocks with the substrate, particularly when the micro-perforations include the conical shape (described above). The molding tool is configured to emit sufficient liquid such that at liquid remain embedded in the micro-perforations. In these locations, the protruding feature, when cured from the liquid form, include a shape corresponding to the shape of the conical micro-perforations. Accordingly, the cured protruding features include a shape that defines several features larger than the opening in the exterior region of the substrate. This feature defines a mechanical interlock between the substrate and the protruding feature. The mechanical interlock may offer superior mechanical coupling over adhesively securing protruding features or simple molding of a protruding feature onto an exterior region of a substrate.

The liquid polymer may be made from silicone or a silicone-based material. Generally, any curable liquid may be used that includes a relatively low viscosity that allows the liquid to flow through the micro-perforations. Testing shows that liquid polymer having a viscosity of 950,000 centipoise ("cP") passed through micro-perforations. However, a "low viscosity" or "relatively low viscosity" liquid polymer may include a viscosity in a range below 950,000 cP. This allows the silicone material in liquid form to pass more readily and easily through the micro-perforations. Further, the liquid selected for the protruding features should be designed to cure at relatively low temperatures. For example, the liquid may cure at a temperature at or below 80 degrees Celsius. In this manner, the regions associated with the micro-perforations do not include a coefficient of thermal expansion significantly different from other regions of the substrate. The cured protruding feature may include a hardness in the "A" range, according to a durometer, which corresponds to a "hard rubber." Also, the liquid, and therefore the protruding features, can include an opaque material or materials, or alternatively, a translucent material or materials. In the latter case, the electronic device may include a light source (e.g., light emitting diode, light guide panel) configured to emit light through the micro-perforations visible to a user of the electronic device that includes the protruding features.

These and other embodiments are discussed below with reference to FIGS. 1-20. However, those skilled in the art will readily appreciate that the detailed description given herein with respect to these Figures is for explanatory purposes only and should not be construed as limiting.

FIG. 1 illustrates an isometric view of an embodiment of an electronic device 100. In some embodiments, the electronic device 100 is a portable computing device. The electronic device 100 may include an enclosure 102 formed from a metallic material (e.g., aluminum). The enclosure 102 may include a lid region 104 that receives a display panel 106 designed to emit visual content to a user. The enclosure 102 may further include a base region 108 that includes several internal components (not shown) enclosure by a top case 110 and a bottom case 112. The bottom case 112 may include several protruding features (not shown) integrated with the bottom case 112 such that when the electronic device 100 is positioned on a surface (e.g., desk), only the protruding features of the electronic device 100 engage the surface.

Figure 2:
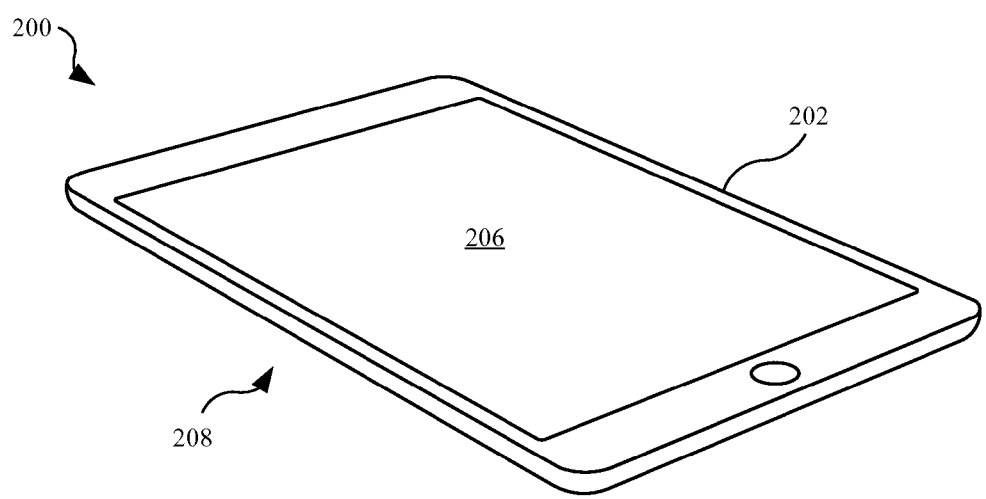
FIG. 2 illustrates an isometric view of an alternative embodiment of an electronic device.

FIG. 2 illustrates an isometric view of an alternate embodiment of an electronic device 200. In some embodiments, the electronic device 200 is a tablet computing device. The electronic device 200 may include an enclosure 202 formed from a metallic material (e.g., aluminum). The enclosure 202 may be designed to receive a display panel 206 designed to emit visual content to a user. The enclosure 202 may further include a bottom region 208 that includes protruding features (not shown) integrated with the bottom region 208 such that when the electronic device 200 is positioned on a surface (e.g., desk), only the protruding features of the electronic device 200 engage the surface.

Figure 3:
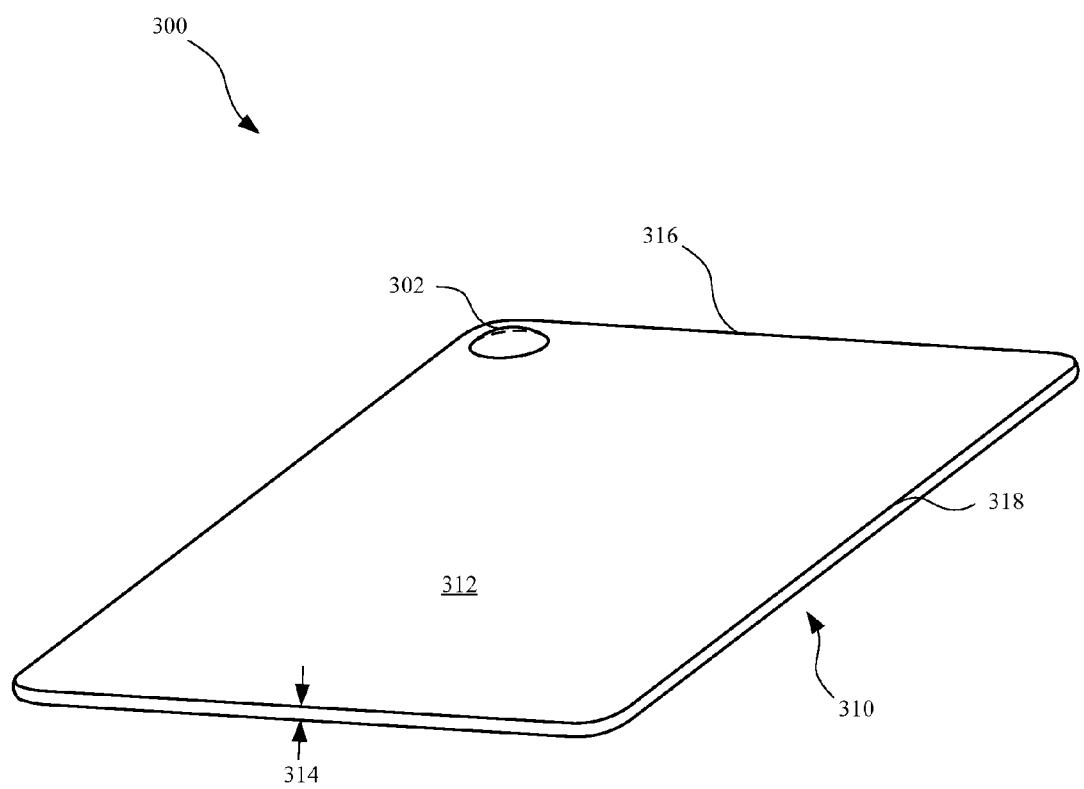
FIG. 3 illustrates an isometric view of a substrate that may be part of a base, or lower region, of an electronic device, in accordance with the described embodiments.

FIG. 3 illustrates an isometric view of a substrate 300 that may be part of a base, or lower region, of an electronic device, in accordance with the described embodiments. In some embodiments, the substrate 300 is part of a bottom case 112 (shown in FIG. 1). In other embodiments, the substrate 300 is part of a bottom region 208 of the enclosure 202 (shown in FIG. 2). Still, in other embodiments, the substrate 300 is part of a standalone keyboard (not shown). In either case, the substrate 300 is also formed from the same material or materials as that of the bottom case 112 or bottom region 208, depending on the electronic device chosen. In some embodiments, the substrate 300 includes several protruding features. For example, the substrate 300 may include two or more protruding features. In the embodiment shown in FIG. 3, the substrate 300 includes a protruding feature 302. Also, as shown in FIG. 3, the protruding feature 302 is generally located in a corner region of the substrate 300. However, the protruding feature 302 may be formed in any location on the substrate 300. For example, the protruding feature 302 may be positioned proximate to a first dimension 316 (e.g., width) and/or a second dimension 318 (e.g., length) of the substrate 300. Also, in some embodiments, the protruding feature 302 includes a polygonal shape having three or more sides or edge. However, in the embodiment shown in FIG. 3, the protruding feature 302 is generally circular or round and may include an exterior cosmetic surface suitable for consumer electronics. Further, the protruding feature 302 may include a shape that is representative of the remaining protruding features of the substrate 300.

The substrate 300 may include an interior region 310 and an exterior region 312 opposite the exterior region 312, with the interior region 310 and the exterior region 312 separated by a thickness 314 of the substrate 300. The interior region 310 is associated with an internal surface of the substrate 300. Generally, the interior region 310 is not visible when the electronic device is assembled. The exterior region 312 is associated with an exterior surface and is generally visible when the electronic device is assembled. The exterior region 312 may also be referred to as a cosmetic surface that ideally includes an aesthetic appearance. Accordingly, the protruding features generally extend outward with respect to the exterior region 312.

The protruding features shown in FIG. 3 may be used for one or more purposes. For example, the protruding features may be configured to engage a surface on which the electronic device lies. This may prevent or reducing scratching or other damage to the electronic device. Also, the protruding features may include a coefficient of friction between the electronic device and the surface such that the electronic device is less prone to sliding or moving in an undesired manner.

Figure 4:
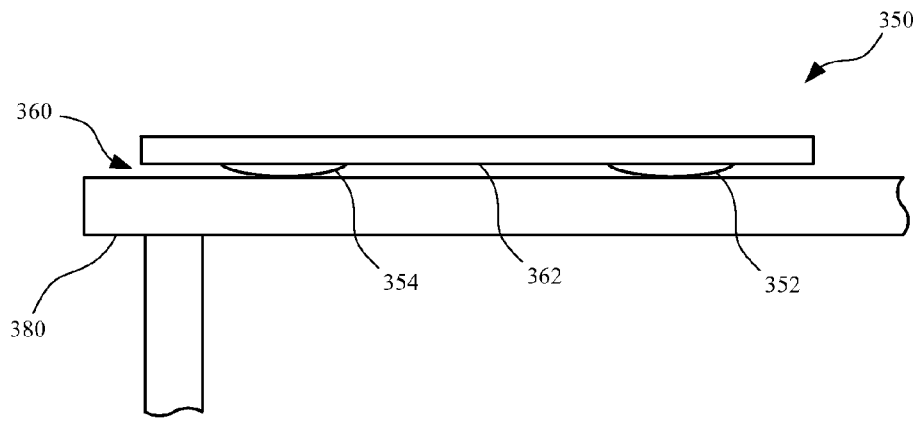
FIG. 4 illustrates a side view of the substrate shown in FIG. 3, showing a first dimension of the substrate.
Figure 5:
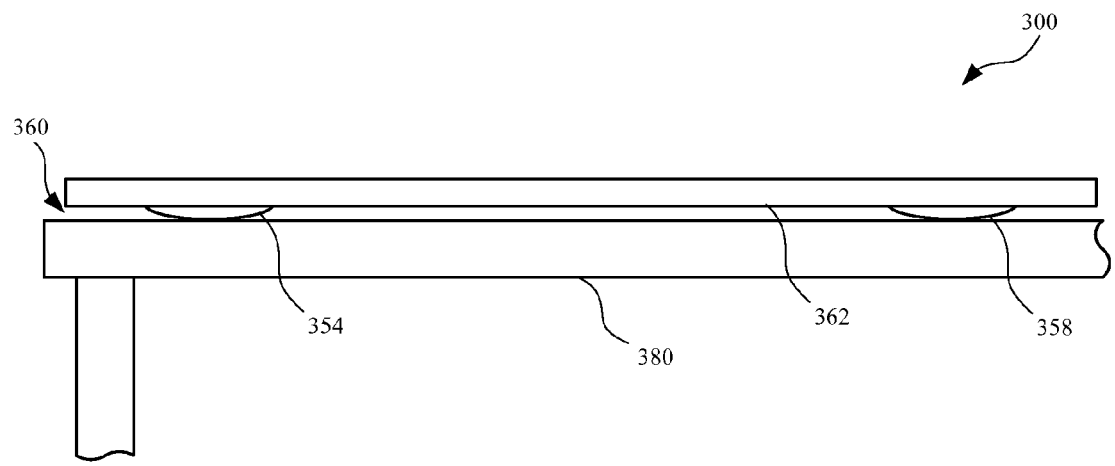
FIG. 5 illustrates an alternate side view of the substrate shown in FIG. 3, showing a second dimension of the substrate.

FIGS. 4 and 5 illustrate side views of a substrate 350 in accordance with the described embodiments, to show additional properties of the protruding features. For example, several protruding features of the substrate 350 are designed to be cured and mechanically coupled with the substrate 350 of an electronic device to provide the electronic device with a substantially level configuration when the substrate 350 is engaged with a surface 380.

FIG. 4 illustrates a side view of a substrate 350 along the first dimension 366 of the substrate 350 showing a first protruding feature 352 and a second protruding feature 354 lying on the surface 380. FIG. 5 illustrates an alternate side view of the substrate 350 along the second dimension 368 of the substrate 350 with the second protruding feature 354 and a third protruding feature 356 lying on the surface 380. FIGS. 4 and 5 combine to show that the substrate 350 can include multiple protruding features, the formation of which is described herein, that allow an electronic device that includes the substrate 350 to be substantially level or at least substantially parallel to the surface 380. Also, the protruding features may combine to define a clearance 360 between the exterior region 362 and the surface 380. In this manner, the substrate 350 may be free of contact with the surface 380.

FIG. 6 illustrates a plan view of an interior region 410 of a substrate 400 that includes multiple regions of apertures extending through the substrate 400, in accordance with the described embodiments. The apertures, as shown, may be referred to as micro-apertures. As shown, the substrate 400 includes a region 402 of apertures. The apertures in these regions may be formed within the substrate 400 using a laser ablation tool (shown later). For purposes of illustration, an enlarged view of a portion of the region 402 of apertures is shown, with the region 402 having an aperture 420 (representative of other apertures in the substrate 400) with an opening 422 having a first diameter 424 on the interior region 410. Due to its relatively small size, the aperture 420 may also be referred to as a micro-aperture.

FIG. 7 illustrates a plan view of the substrate 400 shown in FIG. 6, oriented to show an exterior region 412 of the substrate 400. The exterior region 412 is associated with a surface opposite to that of the interior region 410 (shown in FIG. 6). The regions of several apertures extend through the substrate 400, and accordingly, the region 402 of apertures extend to the exterior region 412. However, as seen from the exterior region 412, the regions of multiple apertures (depicted in gray) are less visible, and in some cases, not visible to the human eye. This may be due in part to the laser ablation tool forming an aperture initially through the interior region 410 (in FIG. 6) such that any residue remains in the interior region 410. Further, the laser ablation tool may form the apertures such that the apertures are conical. In other words, the apertures include openings on the exterior region 412 that are smaller than openings on the interior region 410. For example, in the enlarged view of a portion of the region 402 of apertures shown in FIG. 7, the aperture 420 (also shown in FIG. 6) includes an opening 426 having a second diameter 428 on the exterior region 412 that is less than the first diameter 424 on the interior region 410.

Also, in some embodiments, the apertures are formed in an ordered (non-randomized) manner. In those embodiments, adjacent apertures within each region are spaced apart a distance approximately in the range of 150-200 microns. However, in the embodiment shown in FIGS. 6 and 7, the apertures are generally in a randomized pattern. Also, it will be appreciated that the size of the apertures and the distance between adjacent apertures may not be drawn to scale. Further, in some embodiment, the substrate 400 includes several regions of apertures similar to the region 402 of apertures, and having similar proportional diameters in the interior region 410 and the exterior region 412. For example, the several regions of apertures may be positioned in each corner regions of the substrate 400 shown in FIGS. 6 and 7.

Figure 8:
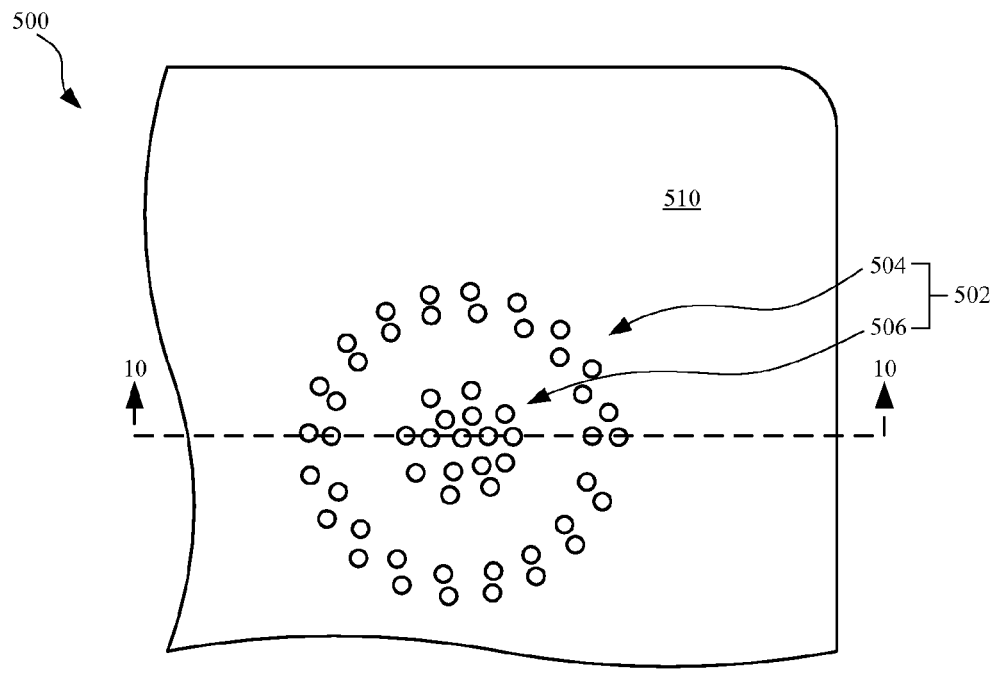
FIG. 8 illustrates an enlarged plan view showing a portion of an interior region of a substrate having an alternate pattern of several apertures extending through the substrate, in accordance with the described embodiments.

Although the apertures shown in FIGS. 6 and 7 combine to generally form a circular region of apertures, other configurations of apertures may be used. For example, FIG. 8 illustrates enlarged view showing a portion of an interior region 510 of a substrate 500 having an alternate pattern of several apertures extending through the substrate 500, in accordance with the described embodiments. The apertures, as shown, may be referred to as micro-apertures. The substrate 500 includes a region 502 of apertures, or openings, having a first region 504 of apertures, or openings, in a ring like manner surrounding a second region 506 of apertures, or openings, with the second region 506 generally having a circular configuration. The first region 504 and the second region 506 may contribute to a molding technique of a protruding feature (not shown) and will be discussed in detail below. Also, the substrate 500 may include several other regions of apertures having a similar configuration as that of the region 502 of apertures.

Figure 9:
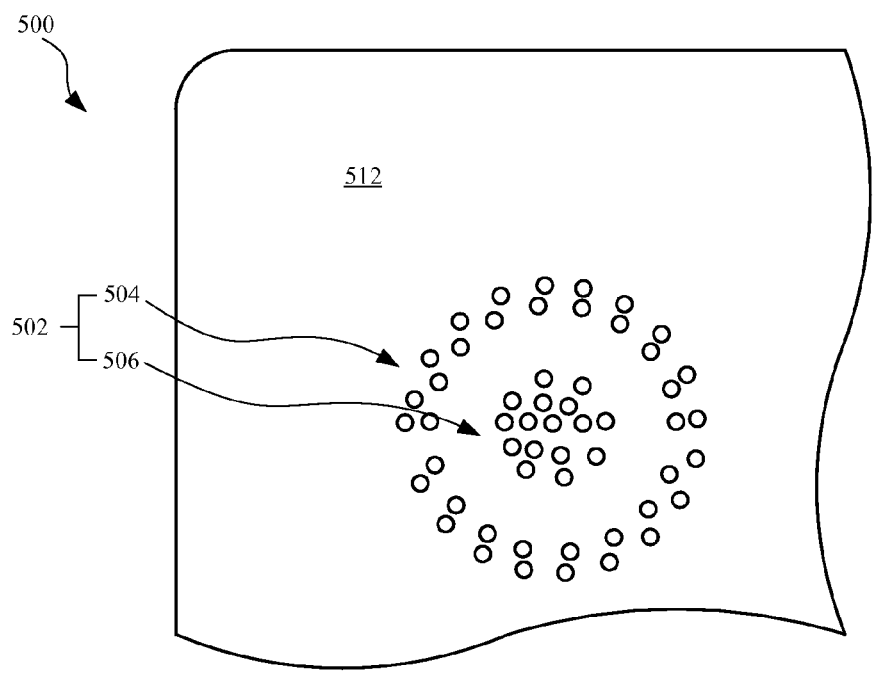
FIG. 9 illustrates an enlarged plan view of the substrate shown in FIG. 8, oriented to show the exterior region of the substrate.

FIG. 9 illustrates an enlarged plan view of the substrate 500 shown in FIG. 8, oriented to show the exterior region 512 of the substrate 500. As shown, the region 502 of apertures extends to the exterior region 512. However, at least some of the apertures may include an opening having a diameter on the exterior region 512 less than a diameter of the corresponding opening on the interior region 510. Accordingly, the openings on the exterior region 512 (depicted in gray) may be less visible, and in some cases, not visible to the human eye.

Figure 10:
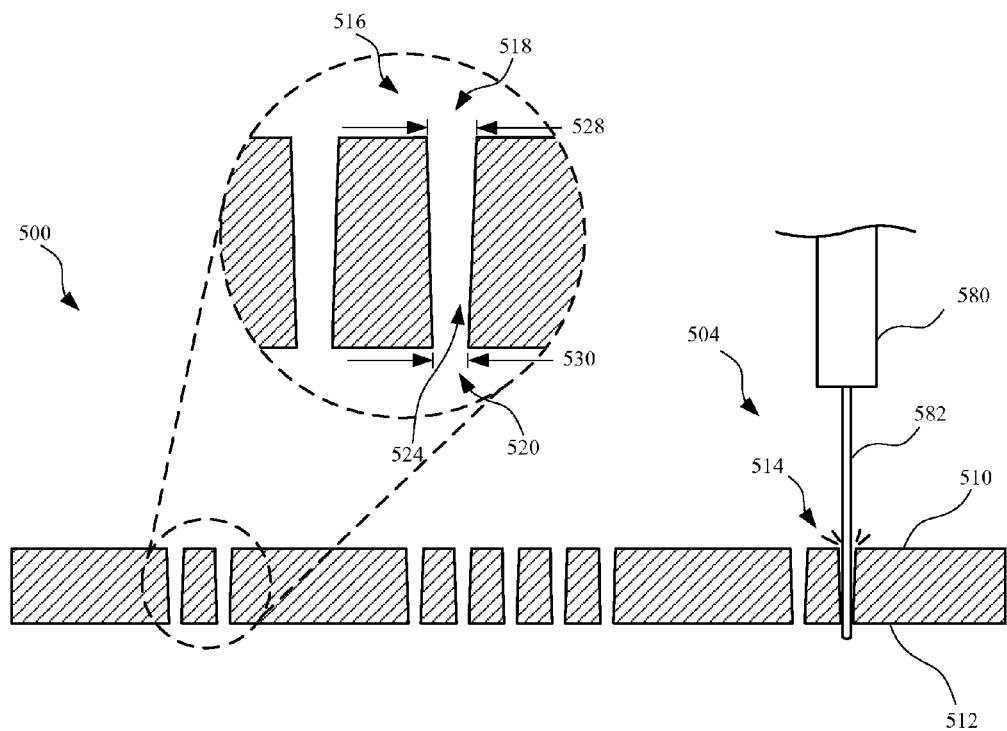
FIG. 10 illustrates a cross sectional view of the substrate shown in FIG. 8, taken along the 10-10 line.

FIG. 10 illustrates a cross sectional view of the substrate 500 shown in FIG. 8, taken along the 10-10 line. As shown, the substrate 500 includes several apertures that may be formed by a laser ablation tool 580. Also, in some embodiments, the laser ablation tool 580 is positioned with respect to the substrate such that the interior region 510 initially receives the laser beam 582 used to form the apertures. For example, as shown in FIG. 10, the laser ablation tool 58 forms an aperture 514 of the first region 504 of apertures by first ablating from the interior region 510 and then to the exterior region 512. Further, the laser ablation tool 580 may be configured, or tuned, to form apertures of different shapes and dimensions. For example, in some embodiments (not shown) the laser ablation tool 580 form substantially cylindrical apertures through the substrate 500, with a representative aperture including an opening in the interior region that is substantially similar in size (including cross sectional area) as comparted to an opening in the exterior region. Also, in some embodiments, the fluid material used to form a protruding feature is relatively viscous (e.g., thermoplastic polyurethane). In those embodiments, the laser ablation tool 580 is capable of forming apertures having larger dimensions than those shown in FIG. 10 such that the relatively high viscous materials may nonetheless flow through the apertures.

Despite the laser ablation tool 580 forming an aperture from the interior region 510 to the exterior region 512 of the substrate 500, a roughness or texture may form on the exterior region 512. Also, in some embodiments, an enclosure of an electronic device, which includes the substrate 500, undergoes an anodization process designed to provide an improved strength and appearance, as well as improved resistance to scratching of the enclosure. This may change or alter the roughness or texture of the substrate 500. However, the exterior region 512 may nonetheless include a roughness or texture from the resultant laser ablation that is substantially similar to the roughness or texture in other regions of the substrate 500 subsequent to the anodization process.

FIG. 10 further illustrates an enlarged view of the substrate 500 in the first region 504 having an aperture 516 representative of other apertures in the substrate 500. Due to its relatively small size, the aperture 516 may also be referred to as a micro-aperture. The laser ablation tool 580 is designed to form the aperture 516 such that the aperture 516 includes a first opening 518 in the interior region 510 and a second opening 520 on the exterior region 512, with the second opening 520 smaller than the first opening 518. Also, the laser ablation tool 580 forms a channel 524 through the substrate 500 that connects the first opening 518 with the second opening 520. Accordingly, the second opening 520 may include a second diameter 530 less than a first diameter 528 of the first opening 518 to define an aperture 516 having a conical shape. In this manner, when a liquid flows through the apertures having a similar configuration as that of aperture 516, the liquid may cure or harden within the apertures. In some embodiments, the first diameter 528 of the first opening 518 is approximately 30 microns. However, in some embodiments, the first diameter 528 is less than 30 microns. Accordingly, the second diameter 530 is smaller to maintain a similar relationship with respect to the first diameter 528, i.e., the second diameter 530 remains smaller than the first diameter 528. Also, based upon the generally circular configuration of the first opening 518 and the second opening 520 and the relationship of the diameters, the first opening 518 includes a first cross sectional area and the second opening 520 includes a second cross sectional area less than the first cross sectional area. The protruding feature may include cured material within the apertures and extending from the exterior region 512 to a location proximate to, or above, the interior region 510. In this manner, the portions of the protruding feature proximate to the interior region 510 include a shape that is larger than the second opening 520 (or the second diameter 530), thereby providing the protruding feature mechanically interlocked to the substrate 500.

Figure 11:
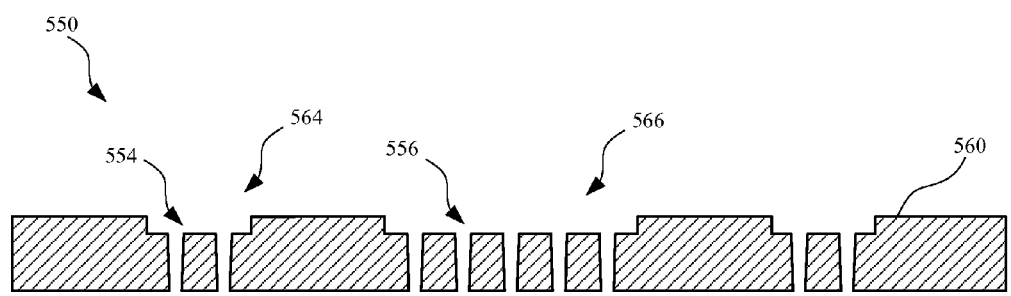
FIG. 11 illustrates a cross sectional view of an alternate embodiment of a portion of a substrate, in accordance with the described embodiments.

FIG. 11 illustrates a cross sectional view of alternate embodiment of a portion of a substrate 550, in accordance with the described embodiments. The substrate 550 may include a region (similar to the region 502 in FIGS. 8 and 9) having a first region 554 of apertures surrounding a second region 556 of apertures. However, in this embodiment, the substrate 550 may include additional portion removed by a material removal process to define a first indention 564 extending around a second indention 566. The first indention 564 and the second indention 566 may be used to receive additional fluid material to form a protruding feature. The first indention 564 and the second indention 566 may designed to ensure a location above the interior region 560 (in a z-direction) is free of any material used to form the protruding feature. In this manner, any protruding feature mechanically coupled to the substrate 550 does not interfere with internal components of an electronic device that includes the substrate 550.

Figure 12:
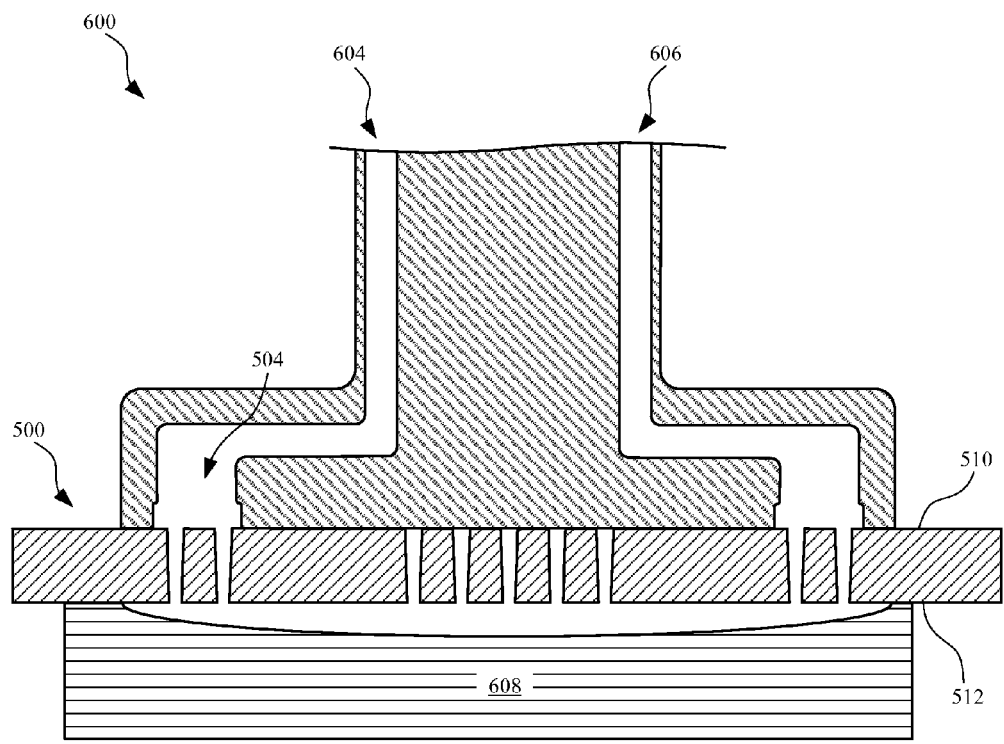
FIG. 12 illustrates a partial cross sectional view of the substrate shown in FIG. 10, with a cross section of a molding tool configured to mold a protruding feature to the substrate, in accordance with the described embodiments.

FIG. 12 illustrates a partial cross sectional view of the substrate 500 shown in FIG. 10, with a cross section of a molding tool 600 configured to mold a protruding feature to the substrate 500, in accordance with the described embodiments. In some embodiments, the molding tool 600 is an injection molding tool capable of injection molding material to a substrate. Also, in some embodiments, the molding tool 600 includes a first chamber 604 and a second chamber 606. Generally, the first chamber 604 and the second chamber 606 are configured to align with regions of apertures. For example, the first chamber 604 and the second chamber 606 are aligned with the first region 504 of apertures, and designed to fill the first region 504 of apertures with a shot (or multiple shots) of material in fluid form used to form a protruding feature. Also, the first chamber 604 and the second chamber 606 are positioned proximate to the interior region 510 such that the material in fluid form first enters the first region 504 of apertures via the interior region 510. The material in fluid form may extend through the first region 504 of apertures and into a mold cavity 608 positioned proximate to the exterior region 512 of the substrate. The mold cavity 608 includes a shape that corresponds to a shape, or internal cavity, that defines a shape of the protruding feature. The mold cavity 608 generally includes a three-dimensional, dome-shaped configuration. However, the mold cavity 608 may embody additional three-dimensional shapes or features. Further, the mold cavity 608 may include a flat, non-rounded configuration to define a flat, non-rounded region of a protruding feature.

Figure 13:
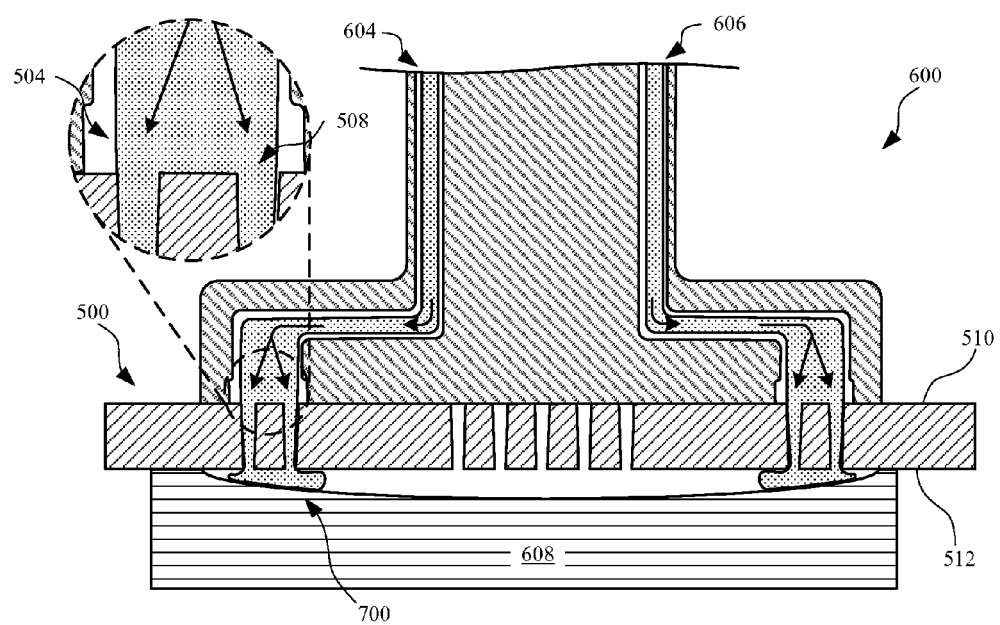
FIG. 13 illustrates the partial cross sectional view of the substrate and the molding tool shown in FIG. 12, showing the molding tool filling the substrate with a material used to form the protruding feature.

FIG. 13 illustrates the partial cross sectional view of the substrate 500 and the molding tool 600 shown in FIG. 12, showing the molding tool 600 filling the substrate 500 with a material 700 in fluid form used to form the protruding feature. The material 700 flows through the first chamber 604 and the second chamber 606 to enter the first region 504 of apertures. Accordingly, the first region 504 of apertures defines a gate through which the material 700 flows. The gate may also be referred to as a channel region 508 that extends through the substrate 500 to allow the material 700 to pass through the substrate 500. Once the material 700 flows through the first region 504, the material 700 continues into the mold cavity 608.

In some embodiments, the material 700 is a silicon-based material. In other embodiments, the material 700 is a urethane acrylate material. Also, in some embodiments, the material 700 is opaque (or cures to form an opaque structure). Still, in other embodiments, the material 700 liquid silicone rubber. Further, in other embodiments, the material 700 is two-part epoxy, or two-part resin, that includes a liquid hardener that may be added to a liquid resin. Generally, the material 700 can be any liquid injection moldable polymer known in the art for injection molding. In this regard, the material 700 can cure to define a polymer feature, or polymeric feature, designed as a protruding feature. Also, in some embodiments, the material 700 is opaque. In the embodiment shown in FIG. 13, the material 700 is transparent. Also, the material 700 is translucent. Further, the material 700 is designed to cure at a temperature of 80 degrees Celsius or less. In this manner, a coefficient of thermal expansion of the substrate 500 in the first region 504 of apertures is not substantially different from a coefficient of thermal expansion of remaining regions of the substrate 500. As a result, the substrate 500 is less susceptible to damage, such as cracking.

Figure 14:
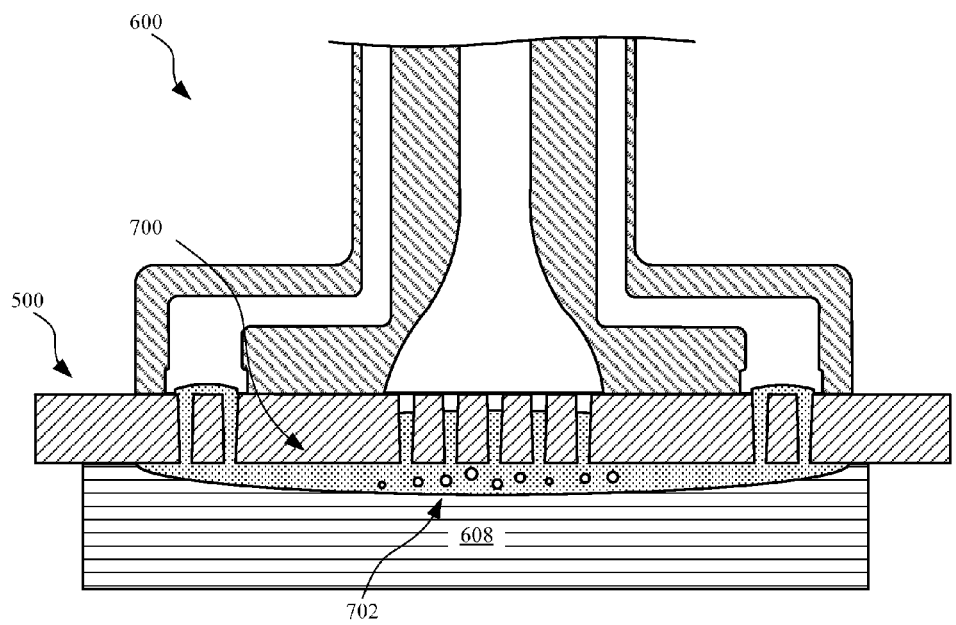
FIG. 14 illustrates the partial cross sectional view of the substrate and the molding tool shown in FIG. 13, showing the molding tool having filled a mold cavity of the molding tool with the material used to form the protruding feature.

FIG. 14 illustrates the partial cross sectional view of the substrate 500 and the molding tool 600 shown in FIG. 13, showing the molding tool having filled the mold cavity 608 of the molding tool 600 with the material 700 used to form the protruding feature. In some cases, the material 700 may include gas molecules 702 defining bubbles in the material 700 that are undesirable. However, prior to curing the material 700, the molding tool 600 is designed to remove the gas molecules 702 from the material 700.

Figure 15:
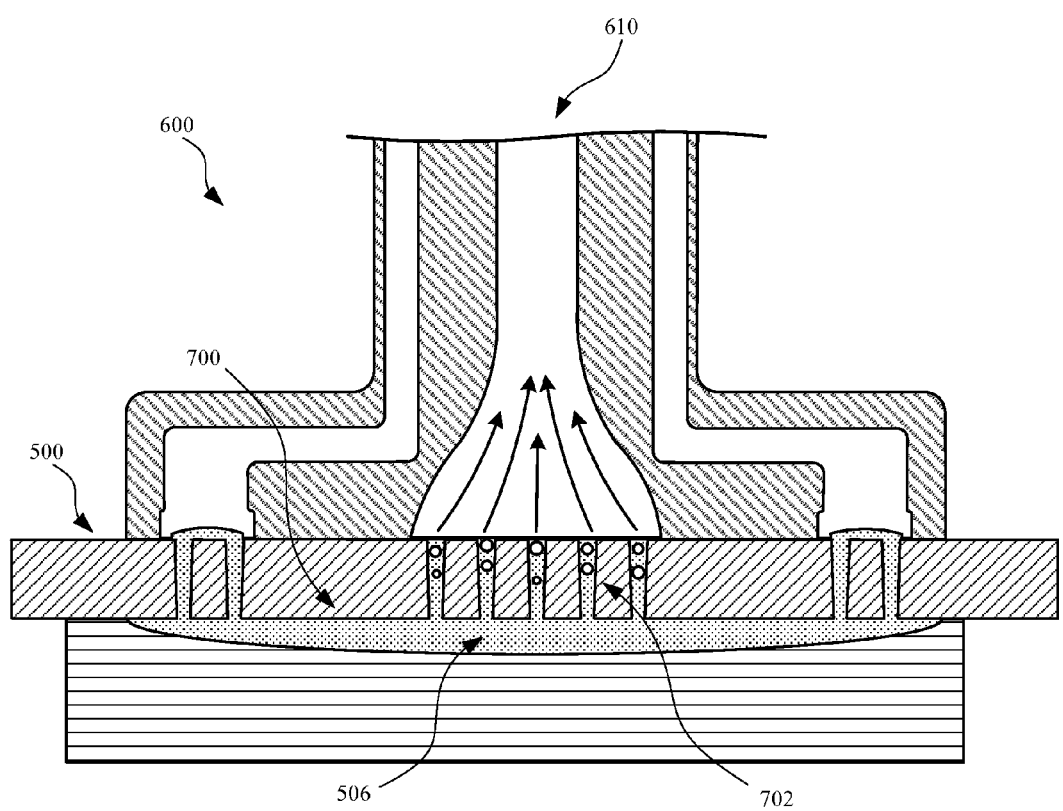
FIG. 15 illustrates the partial cross sectional view of the substrate and the molding tool shown in FIG. 14, showing the molding tool using a vacuum to remove gas molecules from the material used to form the protruding feature.

FIG. 15 illustrates the partial cross sectional view of the substrate 500 and the molding tool 600 shown in FIG. 14, showing the molding tool 600 using a vacuum 610 to remove the gas molecules 702 from the material 700 used to form the protruding feature. The vacuum 610 is designed to align with the second region 506 of apertures in the substrate 500. By allowing the gas molecules 702 to escape from the material 700, the material 700 can cure to form a protruding feature having a uniform density. In this configuration, the vacuum 610 acts as a venting apparatus and is configured for use proximate to the interior region 510 of the substrate 500 as shown in FIG. 15. Therefore, a separate venting apparatus on the exterior region 512 is not required. This may result in greater efficiency as well as keeping the (cosmetic) exterior region 512 free of tooling resulting in a lower probability of damage to the exterior region 512.

Figure 16:
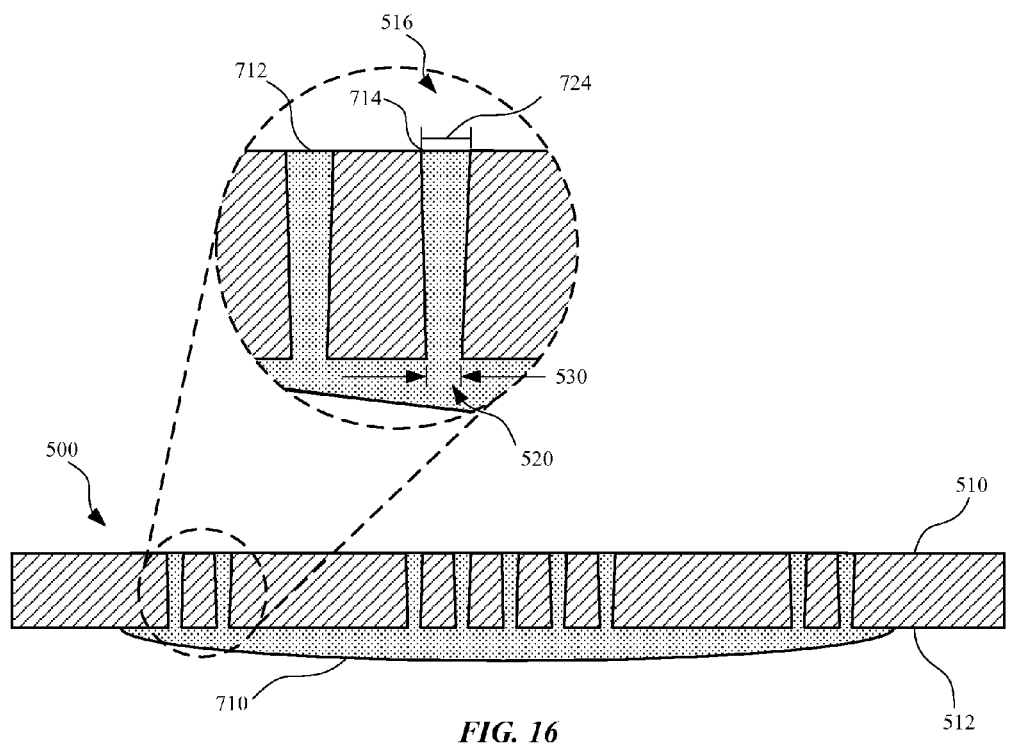
FIG. 16 illustrates a cross sectional view of a protruding feature formed using the molding tool previously described, in accordance with the described embodiments.

FIG. 16 illustrates a cross sectional view of a protruding feature 710 formed using the molding tool previously described, in accordance with the described embodiments. It will be appreciated that the protruding feature 710 has undergone a curing process such that the material 700 (in FIG. 15) is no longer in a liquid form. As shown, the protruding feature 710 is mechanically coupled to the substrate 500. In particular, the protruding feature 710 includes several features, such as a first feature 712 and a second feature 714, that are larger the openings in the exterior region 512 of the substrate. For example, the second feature 714 includes a diameter 724 at the interior region 510 greater than the second diameter 530 of the second opening 520 (of the aperture 516) at the exterior region 512 of the substrate 500. This configuration defines a mechanical interlock between the protruding feature 710 and the substrate 500. Also, it will be understood that the protruding feature 710 is a representative protruding feature and several protruding features may be mechanically interlocked to the substrate 500 in a similar manner. Also, in instances when the protruding features are formed from polymeric material, the protruding features may also be referred to as a polymer feature.

Figure 17:
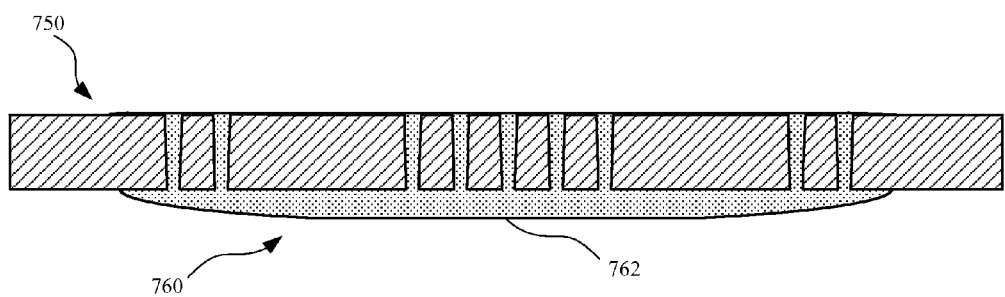
FIG. 17 illustrates a cross sectional view of an alternate embodiment of a substrate including a protruding feature formed using the molding tool previously described.

FIG. 17 illustrates a cross sectional view of an alternate embodiment of a substrate 750 including a protruding feature 760 formed using the molding tool 600 previously described. In this embodiment, the protruding feature 760 includes a flat region 762 that is generally straight, that is, not rounded. Accordingly, a mold cavity (not shown) may include a flat region corresponding to the flat region 762 to form the protruding feature 760 shown in FIG. 17.

Figure 18:
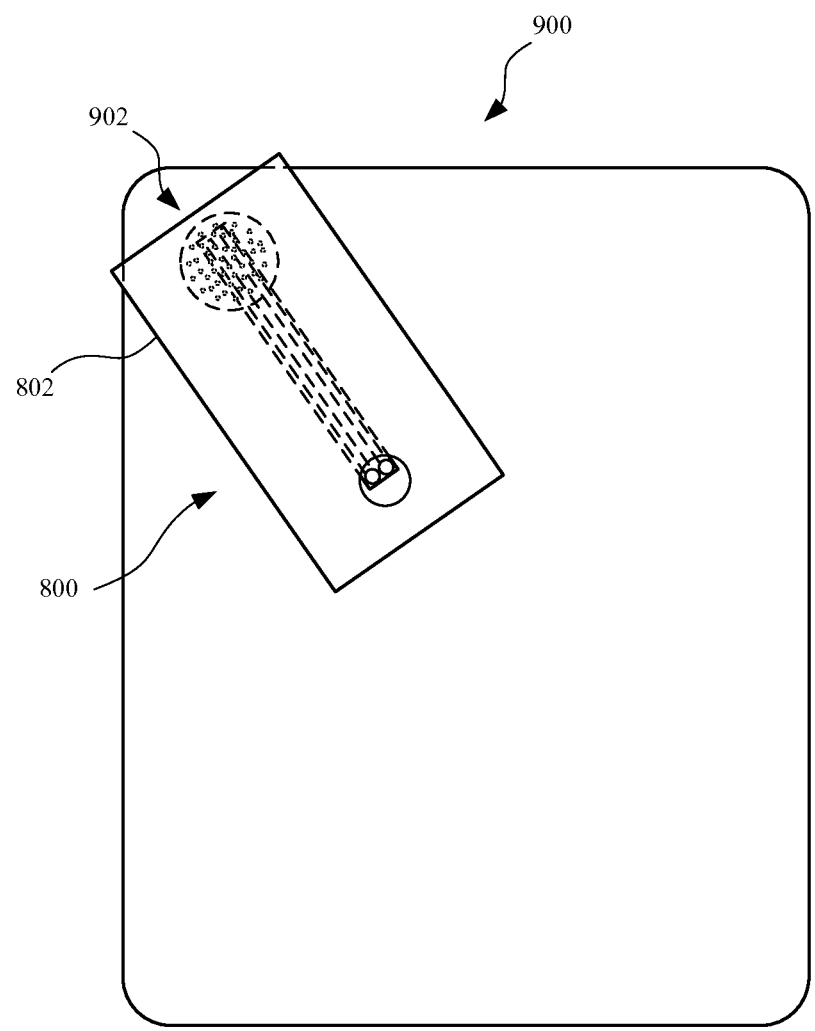
FIG. 18 illustrates a top view of an embodiment of a molding tool having several molding members used to simultaneously form several protruding features to a substrate, in accordance with the described embodiments.

FIG. 18 illustrates a top view of an embodiment of a molding tool 800 having several molding members used to simultaneously form several protruding features to a substrate 900, in accordance with the described embodiments. As shown, the molding tool 800 is positioned over a substrate 900 having several regions of apertures, such as a region 902 of apertures. The molding tool 800 may include any feature or features previously described for a molding tool. Also, the molding tool 800 is designed to include a similar number of mold members as the number of protruding features to be molded to the substrate 900, with the mold members positioned over the regions of apertures. For example, the molding tool 800 in FIG. 18 a first mold member 802 positioned over a region 902 of apertures of the substrate 900. However, in other embodiments with two or more regions of apertures, the molding tool 800 includes a corresponding number of mold members. Also, the molding tool 800 may include a mold cavity (not shown) positioned proximate to a surface of substrate 900 opposite the surface shown in FIG. 18. Further, the mold cavities may be located proximate to the regions of apertures to receive a material from the molding tool 800 used to form protruding features.

Each mold member may include one or more chambers configured to deliver a shot (or multiple shots) of a material in fluid form to each region of apertures of the substrate 900. Also, each mold member may include a vacuum to remove gas molecules within the material in fluid form. Accordingly, multiple protruding features can be formed on the substrate 900 using a molding tool 800 with multiple mold members.

Figure 19:
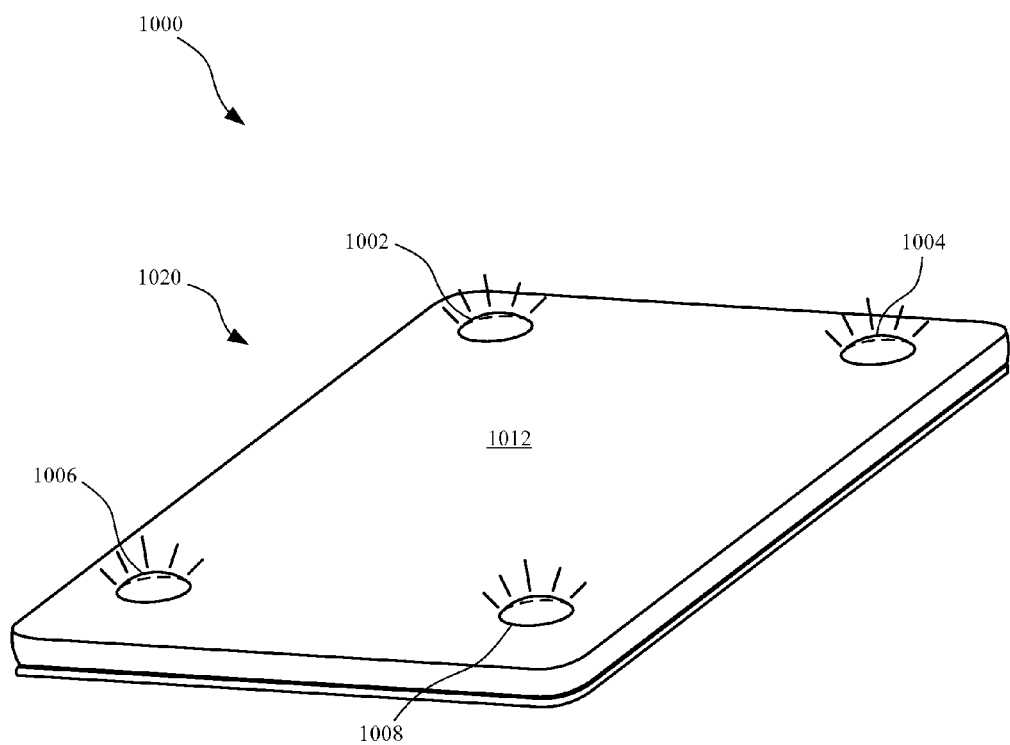
FIG. 19 illustrates an isometric view of showing an exterior region of an electronic device having several protruding features configured to illuminate via the electronic device.

FIG. 19 illustrates an isometric view of showing a bottom region of an electronic device 1000 having several protruding features configured to illuminate via the electronic device 1000. In some embodiments, the electronic device 1000 is a portable computing device (similar to FIG. 1) in a closed configuration. As shown, the electronic device 1000 includes a first protruding feature 1002, a second protruding feature 1004, a third protruding feature 1006, and a fourth protruding feature 1008. The protruding features are mechanically interlocked with the exterior region 1012 of the enclosure 1020 of the electronic device 1000 in a manner previously described for a protruding feature. Also, the protruding features are formed from a translucent material. In this manner, each of the protruding features may illuminate via a light source (not shown) within the electronic device 1000. The light source emits light capable of extending through the regions of apertures through which a portion of the protruding features are positioned.

The illumination of the protruding features may provide an indication of the electronic device 1000 to a user. For example, at least one of the first protruding feature 1002, the second protruding feature 1004, the third protruding feature 1006, and the fourth protruding feature 1008 may illuminate to indicate the electronic device 1000 is in a "standby" or "sleep" mode, both of which are associated with a low-power mode and/or a period of inactivity of the electronic device 1000. Further, at least one of the protruding features may illuminate to green, for example, when an internal power supply (e.g., battery) of the electronic device 1000 is fully charged. Also, at least one of the protruding features may illuminate to yellow or red to illuminate to indicate a medium and low charge, respectively, of the internal power supply. Alternatively, the user may configure the protruding features to illuminate for other desired purposes, and may select, using the electronic device 1000, another color or colors for indication.

Figure 20:
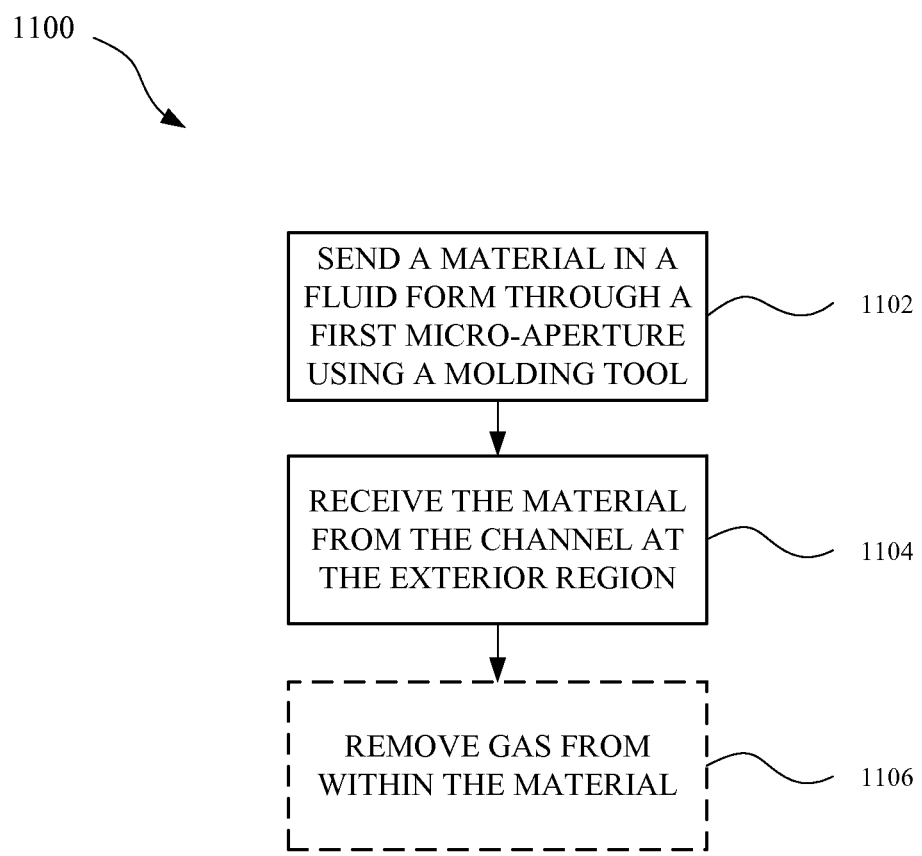
FIG. 20 illustrates a flowchart showing a method for forming a protruding feature to an electronic device.

FIG. 20 illustrates a flowchart 1100 showing a method for forming a polymer feature to a substrate having an interior region and an exterior region opposite the interior region. The substrate may be part of an enclosure, such as a bottom case, of an electronic device. In step 1102, a material in fluid form is sent through a first micro-aperture using a molding tool. In some embodiments, the first micro-aperture is formed in the substrate and include a first opening disposed on the interior region of and a second opening disposed on the exterior region. In some embodiments, the first opening includes a size and a cross sectional area similar to that of the second opening. In other embodiments, the first opening includes a size and a cross sectional area different from the second opening. For example, the first opening may include a size and a cross sectional area greater than that of the second opening. Also, the first opening may be connected with the second opening via a channel formed through the substrate. Also, the first micro-aperture may be part of several micro-apertures may be formed in the substrate. Each of the several micro-apertures may be formed using a laser ablation tool. The laser ablation tool may form each of the micro-apertures with an opening in the interior region approximately in the range of 15 to 50 microns. Also, the laser ablation tool may form conical micro-apertures such that the opening in the interior region is larger than the opening in the exterior region. In other words, the first opening may be greater than that of the second opening.

In step 1104, material is received from the channel at the exterior region via the second opening. Some of the material may remain within the channel. However, the material may further flow into a mold cavity that includes an internal cavity having a shape that defines the feature to be formed.

In an optional step 1106, gas may be removed from the material at the second micro-aperture. The second micro-aperture may include a first opening disposed on the interior region, a second opening disposed on the exterior region, and a channel that opens to the first opening and the second opening. When the material in fluid form cures, it becomes a hardened material that defines a protruding feature. Also, the fluid remaining within the first micro-aperture and the second-micro aperture cures to define a mechanical interlock between the feature and the substrate.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A molding tool configured to mold a feature to a substrate having an interior region and an exterior region opposite the interior region, the molding tool comprising:
    a first chamber configured to align with and fill first micro-apertures formed through the substrate with a moldable material used to form the feature;
    a second chamber configured to align with second micro-apertures formed through the substrate; and
    a mold cavity that communicates with the first chamber and the second chamber via the first micro-apertures and the second micro-apertures, respectively, the mold cavity comprising an internal cavity having a shape of the feature.

2. The molding tool of claim 1, wherein at least one of the first micro-apertures comprises a first opening having a first cross sectional area at the interior region, and a channel through the substrate that connects the first opening with a second opening having a second cross sectional area at the exterior region.

3. The molding tool of claim 2, wherein the first cross sectional area is about equal to the second cross sectional area.

4. The molding tool of claim 2, wherein at least some of the moldable material remains within at least one of the channels.

5. The molding tool of claim 1, wherein the moldable material is a low viscosity liquid polymer.

6. The molding tool of claim 5, wherein the low viscosity liquid polymer is selected from a group comprising liquid silicone rubber, urethane acrylate, and a two-part resin.

7. An electronic device, comprising:
    a substrate comprising an interior region and an exterior region, the exterior region defining a visible region of the substrate when the electronic device is assembled;
    a plurality of micro-apertures, comprising:
        a first micro-aperture extending from a first opening in the interior region to a second opening in the exterior region, the first opening having a first diameter, the second opening having a second diameter; and
        a second micro-aperture extending from a third opening in the interior region to a fourth opening in the exterior region; and
    a polymer feature extending from the exterior region to the interior region, wherein a portion of the polymer feature is positioned within the first micro-aperture and the second micro-aperture.

8. The electronic device of claim 7, wherein the polymer feature is formed of a low viscosity liquid polymer selected from a group comprising liquid silicone rubber, urethane acrylate, and a two-part resin or other low viscosity molding polymer.

9. The electronic device of claim 8, wherein the low viscosity liquid polymer is translucent or transparent or opaque.

10. The electronic device of claim 9, further comprising a light source, wherein when the light source is activated the low viscosity polymer allows the light to pass through the low viscosity polymer to illuminate the polymer feature.

11. The electronic device of claim 7, wherein the polymer feature comprises:
    a mechanical interlock in the interior region;
    a cosmetic exterior that hides the first micro-aperture, the second micro-aperture, and the mechanical interlock.

12. The electronic device of claim 7, wherein the polymer feature protrudes relative to the exterior region of the substrate to define an exterior surface of the polymer feature.

13. The electronic device of claim 12, wherein the exterior surface of the polymer feature is rounded.

14. The electronic device of claim 12, wherein the exterior surface of the polymer feature defines a polygonal shape.

15. The electronic device of claim 12, wherein the exterior surface of the polymer feature comprises a flat region.

16. The electronic device of claim 7, wherein the plurality of micro-apertures comprises a first region of micro-apertures surrounded by a second region of micro-apertures.

17. The electronic device of claim 16, wherein the polymer feature covers the first region of micro-apertures and the second region of micro-apertures.

18. The electronic device of claim 7, wherein the second diameter is less than the first diameter.

19. The electronic device of claim 7, wherein the first micro-aperture defines a conical shape.

20. The electronic device of claim 7, wherein the first micro-aperture defines a cylindrical shape.

* * * * *